United States Patent Office 3,394,134
Patented July 23, 1968

3,394,134
PROCESS FOR THE MANUFACTURE OF 4,6-DI-CHLORO-1,3,5-TRIAZINE DERIVATIVES
Max Duennenberger, Frenkendorf, Hans Rudolf Biland, Basel, and Christian Luethi, Munchenstein, Switzerland, assignors to Ciba Limited, Basel, Switzerland, a company of Switzerland
No Drawing. Filed Dec. 7, 1965, Ser. No. 512,205
Claims priority, application Switzerland, Dec. 21, 1964, 16,413/64
6 Claims. (Cl. 260—248)

ABSTRACT OF THE DISCLOSURE

A new process is provided for selectively manufacturing 2-substituted 4,6-dichlorotriazines of the formula

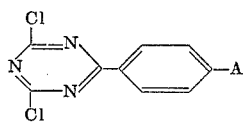

in which A stands for either a halogen group, especially chlorine or phenyl. In applicants' process, cyanuric chloride is reacted with the compound of the formula

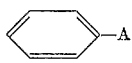

where A has the above-assigned meaning in the presence of a Friedel-Crafts catalyst, preferably aluminum chloride, at a temperature of at least 70° C.

---

The reaction of cyanuric chloride with certain aromatic compounds in the presence of aluminum chloride is known. However, this known process gives only in exceptional cases rise to unitary monosubstituted or disubstituted derivatives of cyanuric chloride. Even when the aromatic compound and cyanuric chloride are reacted in molecular proportions (1:1), the result is in general a mixture which contains mono-, di- and tri-substituted products and in addition unreacted cyanuric chloride. It is therefore easy to realize why for the manufacture of unitary monosubstituted dichlorotriazines and disubstituted monochlorotriazines other routes were used in which cyanuric chloride was not used as starting material and the triazine ring was synthesized by different methods.

It has now been found that 4,6-dichlorotriazine derivatives of the formula (1) 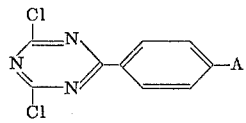

where A represents a halogen atom or a phenyl group, can be obtained in a surprisingly smooth and unitary form without any appreciable competitive side reactions by reacting cyanuric chloride at an elevated temperature with a compound

where A has the above meaning, in the presence of a Friedel-Crafts catalyst.

The present process is especially significant when, if A stands for halogen, it represents a chlorine atom. Thus, one variant of the invention consists in the manufacture of 2-(4'-chlorophenyl)-4,6-dichloro-1,3,5-triazine by reacting preferably cyanuric chloride with an excess of chlorobenzene in the presence of aluminum chloride in an aqueous medium at a temperature of at least 120° C.

Another important variant consists in preparing 2-[diphenylyl-(4')]-4,6-dichloro-1,3,5-triazine by reacting cyanuric chloride in an identical manner with diphenyl in an aqueous medium in the presence of a Friedel-Crafts catalyst, preferably aluminum chloride, in a dichlorobenzene.

It could certainly not have been expected that in this reaction a substantially unitary yield of the monosubstitution product would be obtained and, more especially, that this should even be the case when, for example, in the manufacture of 2-(4'-chlorophenyl)-4,6-dichloro-1,3,5-triazine a large excess of chlorobenzene is used. As recently as in the year 1962 Letters Patent were applied for a process, which has been published in the meantime, in which 2-(4'-chlorophenyl)-4,6-dichloro-1,3,5-triazine is manufactured by a complicated route from 4-chlorobenzamidine hydrochloride and trichloromethyl isocyanide dichloride (German Auslegeschrift 1, 178, 437).

For the manufacture of 2-(4'-chlorophenyl)-4,6-dichloro-1,3,5-triazine an excess of chlorobenzene, or if desired or required the addition of an inert organic solvent, is advantageous for operational reasons, because this expedient ensures that the reaction mixture remains thinly liquid and easy to stir. The reaction is advantageously carried out at a temperature which is at least 120° C. and is within the range from 120° C. to the boiling point of the reaction mixture. If the reaction is performed with a substantial excess of chlorobenzene, it is advantageous to maintain the reaction mixture at the boil, while providing reflux cooling to allow the chlorobenzene which has passed over to return to the reaction mixture and ensuring a continuous removal of the hydrochloric acid gas formed.

A preferred Friedel-Crafts catalyst is aluminum chloride, used, for example, in an amount of 0.7 to 1.5 mols for every mol of cyanuric chloride. The reaction mixture can be worked up in the usual manner, for example by allowing it to cool, pouring it over ice, removing a possible excess of chlorobenzene by steam distillation, separating the solidified residue from the aqueous phase and distilling the 2-(4'-chlorophenyl)-4,6-dichloro-1,3,5 - triazine under reduced pressure.

The other variant of the process of this invention, namely the reaction of cyanuric chloride with diphenyl in the presence of a Friedel-Crafts catalyst at an elevated temperature is advantageously performed in the presence of an inert organic solvent, such as dichlorobenzene. In this case the reaction temperature is advantageously at least 70° C. and may range from 70° C. to the boiling temperature of the reaction mixture. A preferred Friedel-Crafts catalyst is here likewise aluminum chloride in an amount of 0.7 to 1.5 mols for every mol of cyanuric chloride. The reaction mixture is worked up in the same manner as described above.

Parts in the following examples are by weight.

Example 1

A mixture of 55.5 parts of cyanuric chloride, 44 parts of anhydrous aluminum chloride and 1500 parts of chlorobenzene is heated to 130–132° C. and stirred and heated at this temperature for 50 hours. The batch is then cooled to room temperature, poured over 300 parts of ice and subjected to a steam distillation, to yield 2-(4'-chlorophenyl)-4,6-dichloro-1,3,5-triazine of the formula (2) 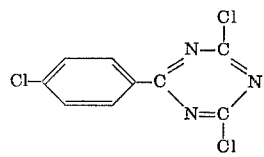

in the form of brown crystals melting at 143–148° C.

The yield amounts to 64 to 68 parts. On distillation under vacuum, this product yields 60 to 65 parts of a pure, colorless product melting at 148–149° C. and boiling at 153–154° C. under 0.2 mm. Hg pressure.

Example 2

A mixture of 185 parts of cyanuric chloride, 154 parts of diphenyl and 600 parts of dichlorobenzene is stirred for 30 minutes at 18–22° C., and then 147 parts of anhydrous aluminum chloride are added in portions. Immediately following, the temperature is raised to 130° C. After stirring for 4 hours at 130° C., the dark solution is poured over 2000 parts of a mixture of ice and water, the organic phase is freed from acid by decantation, and the dichlorobenzene is expelled by steam distillation. On suctioning and drying there are obtained about 252 parts of the crude product of the formula (3)
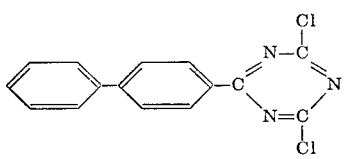

At an external temperature of 260–280° C. the crude product yields under 0.03 mm. Hg pressure 144 parts of 2 - [diphenylyl - (4')] - 1,6 - dichloro - 1,3,5 - triazine which in turn yields after one recrystallization from methylenechloride 121 parts of a product melting at 160–161° C.

What is claimed is:

1. Process for the manufacture of 4,6-dichlorotriazine derivatives of the formula

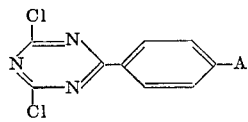

where A represents a member selected from the group consisting of a halogen atom and a phenyl group, wherein cyanuric chloride is reacted with a compound of the formula

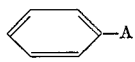

(where A has the indicated meaning) in the presence of a Friedel-Crafts catalyst at a temperature of at least 70° C.

2. Process according in claim 1 for the manufacture of 2 - (4' - chlorophenyl) - 4,6 - dichloro - 1,3,5 - triazine, wherein cyanuric chloride is reacted with chlorobenzene in the presence of a Friedel-Crafts catalyst at a temperature of at least 120° C.

3. Process according to claim 2 for the manufacture of 2 - (4' - chlorophenyl) - 4,6 - dichloro - 1,3,5 - triazine, wherein cyanuric chloride is reacted with excess chlorobenzene in the presence of aluminum chloride in an anhydrous medium at a temperature of at least 120° C.

4. Process according to claim 1 for the manufacture of 2 - [diphenylyl - (4')] - 4,6 - dichloro - 1,3,5 - triazine, wherein cyanuric chloride is reacted with diphenyl in the presence of a Friedel-Crafts catalyst in an anhydrous medium at a temperature of at least 70° C.

5. Process according to claim 4, wherein the reaction is carried out in the presence of an inert organic solvent, preferably of a dichlorobenzene.

6. Process according to claim 4, wherein aluminum chloride is used as Friedel-Crafts catalyst.

References Cited

UNITED STATES PATENTS

| | | | |
|---|---|---|---|
| 1,897,428 | 2/1933 | Hentrich et al. | 260—248 |
| 2,232,871 | 2/1941 | Schmidt et al. | 260—248 |
| 2,325,803 | 8/1943 | Schmidt et al. | 260—248 |
| 2,691,020 | 10/1954 | Gadea et al. | 260—248 |
| 3,259,627 | 7/1966 | Duennenberger et al. | 260—248 |

OTHER REFERENCES

Koopman, "Nieuwe Herbicide 1,3,5-Triazine Derivaten," University of Groningen, Netherlands (1957) pp. 22–6.

JOHN D. RANDOLPH, *Primary Examiner.*

J. M. FORD, *Assistant Examiner.*